(12) United States Patent
Ramanath et al.

(10) Patent No.: US 11,730,646 B2
(45) Date of Patent: Aug. 22, 2023

(54) SYSTEM AND METHOD TO COMBINE INPUT FROM MULTIPLE SENSORS ON AN AUTONOMOUS WHEELCHAIR

(71) Applicant: Rajeev Ramanath, San Jose, CA (US)

(72) Inventors: Rajeev Ramanath, San Jose, CA (US); Ramin Nabati, Ann Arbor, MI (US)

(*) Notice: Subject to any disclaimer, the term of this patent is extended or adjusted under 35 U.S.C. 154(b) by 207 days.

(21) Appl. No.: 17/485,350

(22) Filed: Sep. 25, 2021

(65) Prior Publication Data

US 2023/0095624 A1 Mar. 30, 2023

Related U.S. Application Data

(63) Continuation of application No. 63/083,143, filed on Sep. 25, 2020, and a continuation of application No. 63/083,125, filed on Sep. 25, 2020.

(51) Int. Cl.
*A61G 5/04* (2013.01)
*G05D 1/02* (2020.01)

(52) U.S. Cl.
CPC ............ *A61G 5/04* (2013.01); *G05D 1/0217* (2013.01); *G05D 1/0238* (2013.01); *G05D 1/0246* (2013.01); *A61G 2203/22* (2013.01); *A61G 2203/40* (2013.01); *A61G 2203/72* (2013.01); *G05D 2201/0206* (2013.01)

(58) Field of Classification Search
None
See application file for complete search history.

(56) References Cited

U.S. PATENT DOCUMENTS

| | | | | |
|---|---|---|---|---|
| 11,016,491 | B1* | 5/2021 | Millard | G06N 3/045 |
| 2009/0087029 | A1* | 4/2009 | Coleman | G06V 10/255 |
| | | | | 382/103 |
| 2014/0090171 | A1* | 4/2014 | Hyde | G05D 1/0227 |
| | | | | 701/2 |
| 2015/0245962 | A1* | 9/2015 | Furuta | A61G 5/06 |
| | | | | 901/1 |
| 2015/0310146 | A1* | 10/2015 | Tanzmeister | G08G 1/167 |
| | | | | 703/2 |
| 2017/0124476 | A1* | 5/2017 | Levinson | G06V 20/58 |
| 2019/0049968 | A1* | 2/2019 | Dean | A61G 5/04 |
| 2019/0114507 | A1* | 4/2019 | Chiu | G01C 21/206 |
| 2019/0192361 | A1* | 6/2019 | Sankai | A61G 5/04 |
| 2020/0272148 | A1* | 8/2020 | Karasev | G01S 13/865 |
| 2020/0401148 | A1* | 12/2020 | Hong | G05D 1/0223 |

* cited by examiner

*Primary Examiner* — Daniel L Greene

(57) ABSTRACT

The invention discloses a system for controlling the movement of a personal mobility vehicle including a processing unit that receives and processes a location data of one or more obstacles over a period of time, determines a change frequency of change of location of the obstacles during the period of time, and generates a movement state categorization of the obstacles categorizing them into either a dynamic obstacle or a static obstacle. The processing unit further determines a dynamic distance traveled by the dynamic obstacle during the period of time, the velocity of the dynamic obstacle, determines movement probability data that relates to the probability of movement of a static obstacle based on the change frequency of change of location, and, determines velocity prediction data of a dynamic obstacle based on the velocity of dynamic obstacles during various time intervals of the time period.

19 Claims, 14 Drawing Sheets

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |

Fig. 7

SYSTEM AND METHOD TO COMBINE INPUT FROM MULTIPLE SENSORS ON AN AUTONOMOUS WHEELCHAIR

CROSS-REFERENCES TO RELATED APPLICATIONS

This is application claims the benefit of and priority to U.S. Provisional Application No. 63/083,125, entitled SYSTEM AND METHOD TO COMBINE INPUT FROM MULTIPLE SENSORS ON AN AUTONOMOUS WHEELCHAIR, filed on 25 Sep. 2020 and U.S. Provisional Application No. 63/083,143, entitled METHOD FOR THE FUSION OF MONOCULAR IMAGES WITH DEPTH SENSORS FOR A SEAMLESS DEPTH REPRESENTATION OF THE SCENE, filed on 25 Sep. 2020, both of which are incorporated herein by reference in their entirety.

FIELD OF INVENTION

The present invention relates to controlling the movement of a personal mobility vehicle. Specifically, the invention relates to controlling the personal mobility vehicle based on sensor inputs. More specifically, the invention relates to the processing of sensor inputs to determine the direction of movement of the personal mobility vehicle.

BACKGROUND OF INVENTION

Personal mobility vehicles are generally driven by people with restricted or limited mobility of those with disabilities. However, to drive them sometimes requires a set of skills that takes time to master. It can be challenging for a novice user and there is a high probability that due to a lack of skill to drive the vehicle, the vehicle might collide with an obstacle. Even after appropriate time with the vehicle, the vehicle may be required to be driven in a challenging environment, either due to the layout of the airport or the congestion involved. The environment may have multiple moving obstacles, obstacles that are narrowly spaced with respect to each other, etc. These environments pose challenges to even skilled drivers, as the driver may have a perception for the obstacle which may not be appropriate, and which may result in the driver colliding with the obstacle.

Hence, a mechanism is desired where vehicle movement can be guided with an appropriate direction of movement, so as to avoid collisions with obstacles in the area traversed by the personal mobility vehicle.

OBJECTIVE OF INVENTION

The objective of the invention is to provide a mechanism for determining the direction of movement of a personal mobility vehicle, so as to avoid obstacles in the area traversed by the vehicle.

SUMMARY OF INVENTION

The objective of the invention is achieved by a system for controlling the movement of a personal mobility vehicle. The system includes a processing unit that receives and processes a location data of one or more obstacles over a period of time and determines a change frequency related to the frequency of change of location of the obstacles during the period of time and further generates a movement state categorization of the obstacles categorizing them into either a dynamic obstacle or a static obstacle. The processing unit further determines a dynamic distance traveled by the dynamic obstacle during the period of time and also determines a velocity of the dynamic obstacle. Further, based on the change frequency, the processing unit determines a movement probability data that relates to the probability of movement of a static obstacle. And, based on the velocity of dynamic obstacles during various time intervals of the time period, the processing unit determines a velocity prediction data which relates to the prediction of the velocity of a dynamic obstacle.

According to one embodiment of the system, wherein the movement probability data includes a first categorization data categorizing obstacles into zero-likelihood movement obstacles or non-zero-likelihood movement obstacles. The zero-likelihood movement obstacles are the ones that are structural fixtures or permanent fixtures present in the environment, and the non-zero-likelihood movement obstacles are the ones that are non-permanent fixtures or have changed their location in the environment in a predefined time frame. This embodiment is helpful as it further helps in categorizing static obstacles, and keeps the system alerted with the obstacles with non-zero-likelihood movement which can pose challenges for navigation of the vehicle.

According to another embodiment of the system, wherein the processing unit generates a movement grade for the non-zero likelihood movement obstacles, such that the movement grade defines the probability of the obstacle to move, where higher movement grade is assigned to the obstacles that have changed their location multiple times during the predefined time frame or were absent in the environment for a long time during the predefined time frame. This embodiment is further helpful, as the system can factor in the probability of movement of the static obstacle in near future. This shall reduce surprises for the vehicle during navigation, and can make the movement of the vehicle safer.

According to yet another embodiment of the system, wherein the processing unit modifies the movement grade of the non-zero likelihood movement obstacles based on their movement frequency in a predefined time period. This embodiment further keeps on factoring in the frequency of movement of static obstacles. If the obstacle is not moved frequently, or not moved for a long time, it will have a lesser tendency to move in the near future and poses a lesser risk of collision when the vehicle is navigating.

According to one embodiment of the system, wherein the processing unit modifies the movement grade of the non-zero-likelihood movement obstacles based on a first decay rate rule, wherein the first decay rate rule takes into consideration the movement of the obstacle in previous time instances. This embodiment provides an efficient way for factoring in the frequency of movement of the obstacles while changing the grade of non-zero-likelihood movement obstacles.

According to another embodiment of the system, wherein the processing unit establishes a communicative coupling with the dynamic obstacles and categorizes the dynamic obstacles as predictable velocity obstacles if the processing unit is able to establish the communicative coupling to the dynamic obstacle, and categorize the dynamic obstacles as unpredictable velocity obstacles if the processing unit is not able to establish the communicative coupling to the dynamic obstacle. This embodiment is further helpful, as knowledge about obstacles with predictable and unpredictable velocity can help the system to efficiently plan navigation of the vehicle, and can either avoid routes of navigation which has obstacles with unpredictable velocity, or at least efficient movement control planning while driving around dynamic obstacles with unpredictable velocity.

According to yet another embodiment of the system, the system includes one or more sensors adapted to sense the presence of one or more obstacles at more than one instance of time and generates the location data of the obstacles. This embodiment provides an efficient mechanism to generate location information of the obstacles.

According to one embodiment of the system, wherein when there is more than one sensor, each of the sensors generates an individual location data for one obstacle, and the processing unit processes the individual location data from each of the sensors giving equal weightage to each of the individual location data from each of the sensors and generates the location data. The fusion of individual location data of each of the sensors helps in a reliable determination of the location data of the obstacles at a given point in time.

According to another embodiment of the system, wherein the system includes one or more long-range sensors, and one or more short-range sensors, wherein the long-range sensors are those that have a better spatial resolution at large distances and the short-range sensors are those that have a better spatial resolution at smaller distances. Such an arrangement of sensors provides better coverage of obstacles, both at long distances and as well as short distances.

According to yet another embodiment of the system, wherein each of the sensors generates an individual location data for one obstacle, the processing unit processes the individual location data from each of the sensors giving higher weightage to the long-range sensors data for obstacles at long distances, and to the short-range sensors for the obstacles placed at shorter distances, and generate the location data. This embodiment further enhances the reliability of the location data generated, as it considers the capabilities of each of the sensors while generating the location data of the obstacles.

According to one embodiment of the system, wherein when there is more than one sensor, each of the sensors generates an individual location data for one obstacle, and the processing unit processes the individual location data from each of the sensors giving higher weightage to the sensor data of the sensor for which the obstacle is near to its center of the field of view, and generates the location data. This embodiment further enhances the reliability of the location data generated, as it gives higher weightage to the sensor data that is properly able to read the presence of obstacles due to the optimal location in its field of view.

According to another embodiment of the system, wherein the system includes one or more vision sensors generating the image-related data of the obstacle, and one or more depth sensors generating the depth-related data of the obstacle, and the processing unit is processes the image-related data and the depth-related data and generates the location data. This embodiment is helpful, as it is able to efficiently identify the location of the obstacles, due to consideration of depth data.

According to yet another embodiment of the system, wherein the sensors have a data generation frequency defining the number of times the sensor is capable of generating an individual location data in a predefined time period, and the processing unit processes the individual location data from a particular sensor by giving a weightage based on a decay rate rule if the data generation frequency is more than a predefined threshold or based on filtering through a Kalman filter if the data generation frequency is less than a predefined threshold, and generates the location data. The decay rate rules give higher weightage for frequent movement of the obstacles in previous time instances.

According to one embodiment of the system, the system includes a navigation unit that receives the movement state categorization of the obstacles, the velocity of the dynamic obstacle, the movement probability data, the velocity prediction data, and a distance to the obstacles at a given point of time and determines a navigation path at a given point of time. This embodiment helps to efficient and safe planning of navigation of the vehicle.

According to another embodiment of the system, wherein the navigation unit determines a probable distance of the obstacle to the vehicle in a subsequent point of time and compares the probable distance of the obstacle and a threshold distance, and generates the navigation path at a subsequent point of time. This embodiment further helps in making the navigation of the vehicle safer and more efficient.

According to yet another embodiment of the system, wherein the navigation unit determines the shortest possible distance between a current location of the vehicle and a target location of the vehicle at a given point in time and determines the navigation path at a given point in time along the shortest possible path. The current location refers to the location of the vehicle at a particular instance of time, and the target location refers to the location of the vehicle where the vehicle is intending to reach. This embodiment provides for a dynamic route planning of the vehicle considering the shortest route in the presence of obstacles in a particular instance of time.

According to one embodiment of the system, wherein the processing unit is adapted to receive a grid view data defining planar view to be divided into various predefined size grid elements. The planar view is of the environment in which the personal mobility vehicle is located. The processing unit processes the location data of the obstacle and the grid view data and determines the movement state categorization of the obstacles, the velocity of the dynamic obstacle, the movement probability data, the velocity prediction data, and a distance to the obstacles at a given point of time for each of the grid elements.

The object of the invention is also achieved by a computer program product, stored onto a non-transitory medium, which on execution onto one or more processors, enable the one or more processors to perform the following:

receiving and processing a location data of one or more obstacles over a period of time, determining a frequency of change of location of the obstacles during the period of time and generating a movement state categorization of the obstacles categorizing them into either a dynamic obstacle or a static obstacle, determining a distance traveled by the dynamic obstacle during the period of time and to further determine the velocity of the dynamic obstacle, based on the frequency of change of location, determining a movement probability data which relates to the probability of movement of a static obstacle, and based on the velocity of dynamic obstacles during various time intervals of the time period, determining velocity prediction data which relates to the prediction of the velocity of a dynamic obstacle.

BRIEF DESCRIPTION OF DRAWINGS

FIG. 7 illustrates a representation of segmentation of a depth image, according to an embodiment of the invention.

Figure 1:
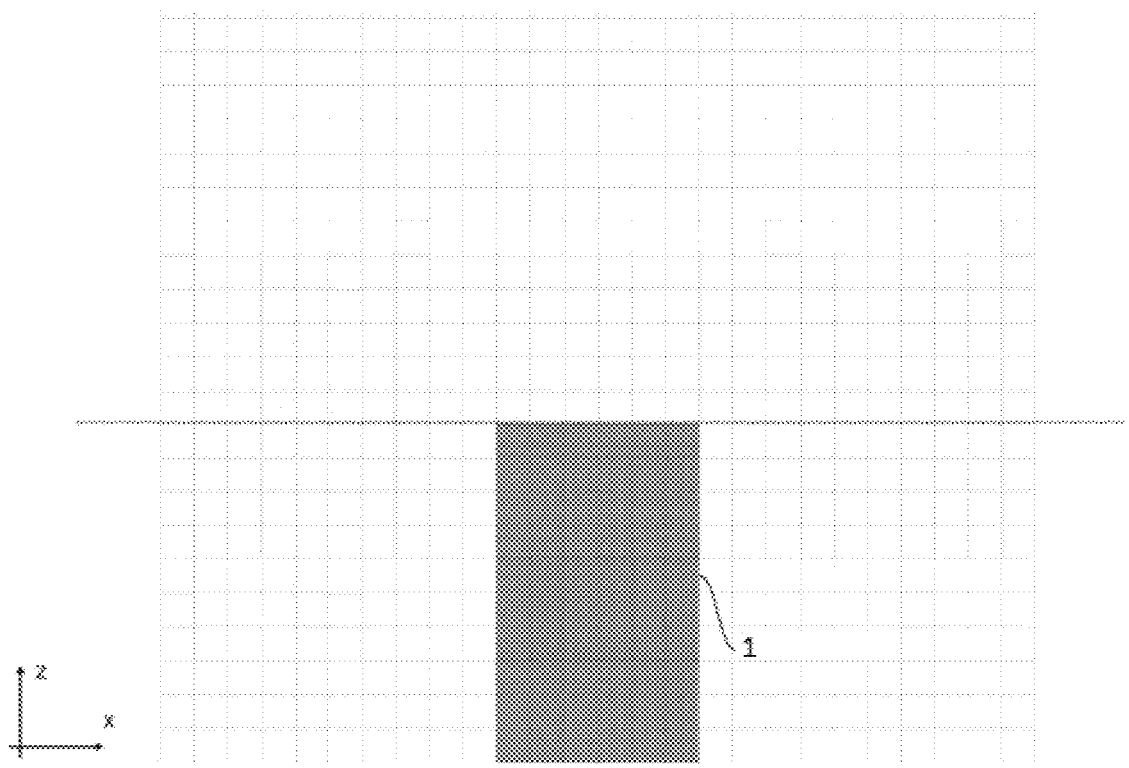
FIG. 1 illustrates a planar area divided into grids with a personal mobility vehicle capturing a grid area.

The figures depict embodiments of the invention for purposes of illustration only. One skilled in the art will readily recognize from the following description that alternative embodiments illustrated herein may be employed without departing from the principles of the invention described herein.

DETAILED DESCRIPTION

The best and other modes for carrying out the present invention are presented in terms of the embodiments, herein depicted in the drawings provided. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment. Throughout the description, the words "wheelchair", "personal mobility vehicle", "PMD", or "vehicle" are interchangeably used, which refers to whether a powered wheelchair or the personal mobility vehicle, as systems and methods of the inventions are equally implementable on a powered wheelchair or a powered personal mobility vehicle.

Figure 15:
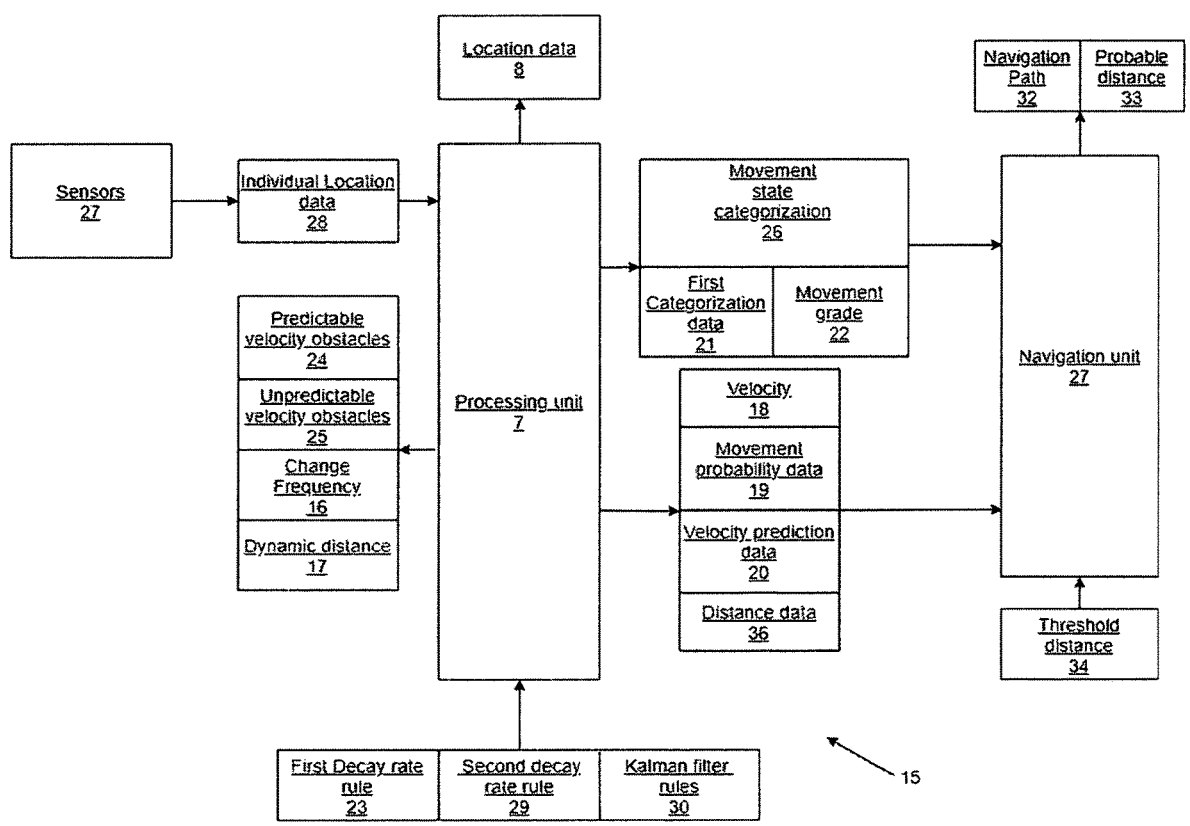
FIG. 15 illustrates a schematic representation of an exemplary system for controlling the movement of a personal mobility vehicle.

In furtherance, the invention is elaborated using FIG. 15 which shows a schematic implementation of a system 15 that controls the movement of a personal mobility vehicle. The system 15 includes sensors 27, processing unit 7, and navigation unit 31 which cooperate together to implement the functionalities of the system 15. Each of the sensors 27 is placed onto the vehicle or in proximity to the vehicle and senses the presence of one or more obstacles at more than one instance of time and generates an individual location data 28 for one obstacle of the obstacles. The processing unit 7 processes the individual location data 28 from each of the sensors 7 generates the location data 8. The processing unit 7 keeps on receiving the data from the sensors 7 over a period of time and determines a change frequency 16 of change of location of the obstacles during the period of time and further generates a movement state categorization 26 of the obstacles categorizing them into either a dynamic obstacle or a static obstacle. The processing unit 7 further determines a dynamic distance 17 traveled by the dynamic obstacle during the period of time and also determines a velocity 18 of the dynamic obstacle. Further, based on the change frequency 16, the processing unit 7 determines a movement probability data 19 which relates to the probability of movement of a static obstacle. And, based on velocity 18 of dynamic obstacles during various time intervals of the time period, the processing unit 7 determines a velocity prediction data 20 which relates to the prediction of the velocity of a dynamic obstacle. The processing unit 7 also generates distance data 35 related to the distance of the vehicle to the obstacles at a given point of time.

The navigation unit 31 receives the movement state categorization 26 of the obstacles, the velocity 18 of the dynamic obstacle, the movement probability data 19, the velocity prediction data 20, and a distance data 35 and determines a navigation path 32 at a given point of time.

In one embodiment, the navigation unit 31 also generates a navigation path at a subsequent point in time. For this, the navigation unit 31 determines a probable distance of the obstacle to the vehicle at a subsequent point of time and compares the probable distance of the obstacle and a threshold distance.

In one embodiment, the navigation unit 31 determines the shortest possible distance between a current location of the vehicle and a target location of the vehicle at a given point of time and determines the navigation path 32 at a given point of time along the shortest possible path. The current location refers to the location of the vehicle where the vehicle is located at a particular instant of time, and the target location refers to the location of the vehicle where the vehicle is intending to reach.

The movement probability data 19 includes a first categorization data 21 categorizing obstacles into zero likelihood movement obstacles or non-zero likelihood movement obstacles. The zero likelihood movement obstacles are the ones that are structural fixtures or permanent fixtures present in the environment, and the non-zero likelihood movement obstacles are the ones that are non-permanent fixtures or which have changed their location in the environment in a predefined time frame. The processing unit 7 further generates a movement grade 22 for the non-zero likelihood movement obstacles, such that the movement grade defines the probability of the obstacle to move, where higher movement grade is assigned to the obstacles which have changed their location multiple times during the predefined time frame or were absent in the environment for a long time during the predefined time frame. The processing unit modifies the movement grade of the non-zero likelihood movement obstacles of the obstacles based on a first decay rate rule, which takes into consideration the movement of the obstacle in previous time instances.

While considering, how much weightage should be given to each of the sensors 27 while processing individual location data 28 from them, the processing unit 7 considers the data generation frequency of the sensors defining the number of times the sensor generates an individual location data 28 in a predefined period of time. In furtherance, the processing unit 7 processes the individual location data from a particular sensor by giving a weightage based on a second decay rate rule 29 if the data generation frequency is more than a predefined threshold, or based on a Kalman filter rules 30 if the data generation frequency is less than a predefined threshold. The second decay rate rules give higher weightage for frequent movement of the obstacles in previous time instances.

In one embodiment, the processing unit 7 may also receive a grid view data of the environment in which the personal mobility vehicle is located. The grid view data defines grid elements formed by dividing a planar view of the environment into grid elements of predefined sizes. The processing unit processes the location data and the grid view data and adapted to determine the movement state categorization of the obstacles, the velocity of the dynamic obstacle, the movement probability data, the velocity prediction data, and a distance to the obstacles at a given point of time for each of the grid elements. Further, various aspects of this embodiment are elaborated through explanations of FIGS. 1-14

To process the inputs from the sensors together, firstly the inputs from each of the sensors are translated onto a planar area of traversing the vehicle, while the area is divided into grid elements. And, sensor values from each of the sensors are represented on these grid elements. Each of the grid elements represents the presence or absence of obstacles from the perspective of each of the sensors that have those grid elements in their range and field of view.

While the grid view ignores the height (y) of the obstacles, each grid element in this grid view would correspond to the likelihood of an obstacle being present. Each such grid element corresponds to a physical x and z location in the real world. The manner in which these grid elements are populated is a function of the types of sensors used, their resolution, and update rates.

For example, as shown in FIG. 1, the wheelchair 1 is denoted with the grey rectangle, the remainder of the scene may be divided into grid elements of interest with their coordinates represented by (x, z). The arrangement of the grid elements could be in an orthogonal space, a hexagonal space, or even a polar representation. For the purposes of this invention, the grid elements are shown in an orthogonal Euclidean space. For the sake of illustration, only the forward and side facing grid elements are shown, but one can envision equivalent grid elements on the reverse side of the wheelchair as well. Each grid element can take a value between "0" and "1" (or an arbitrary integer scale of "0" to "255" or some such digital representation. A value of "1" would denote the absence of an obstacle and a value of "0" would represent that there is an obstacle that entirely occupies that grid element. A number between "0" and "1" would denote one of the following: a probability factor of an obstacle being present, or denote that only part of the grid element is occupied by an obstacle, or denote a change in the state of the grid element as moving obstacles enter and exit that grid element. The choice of "0" and "1" denoting the presence or absence of an obstacle is entirely arbitrary. The choices could easily be reversed with "0" denoting the absence and "1" denoting the presence of an obstacle. The choice used here is merely for illustrative and print purposes.

Figure 2:
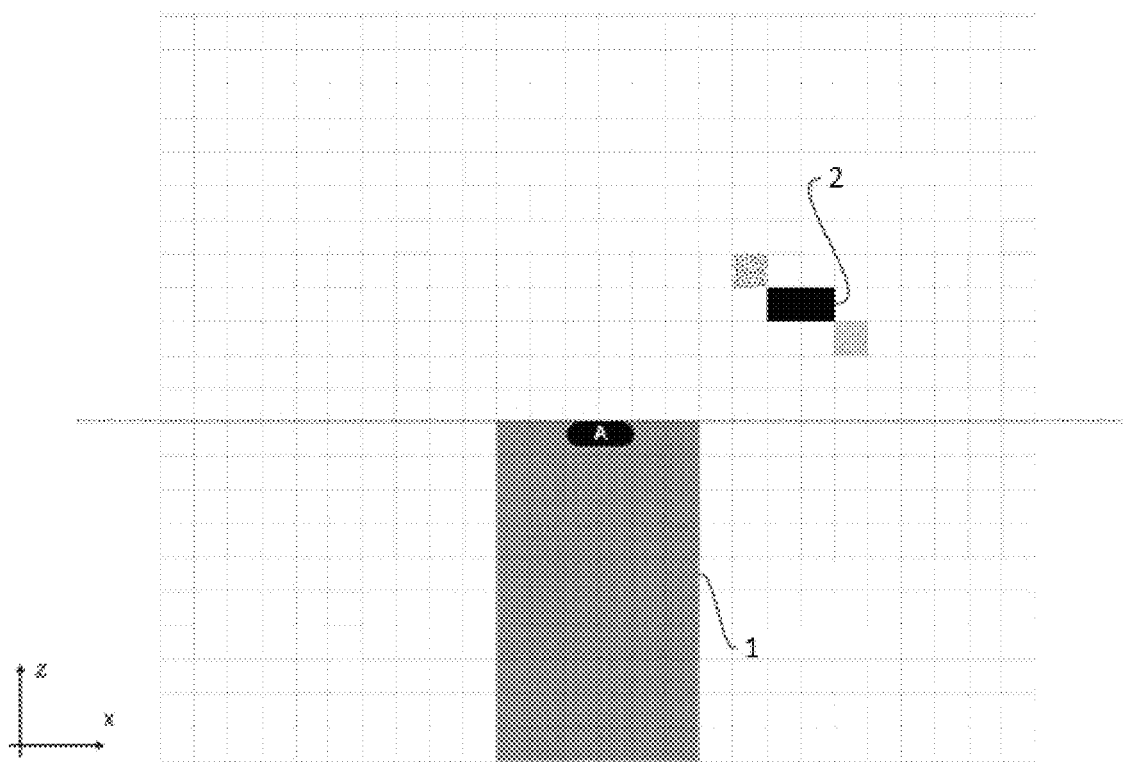
FIG. 2 illustrates the planar area with an obstacle present in the area.

In another example, as shown in FIG. 2, an obstacle 2 is present in the forward right-hand side of the wheelchair 1. Some of the grid elements are solid black (denoting 0) and some others are shades of grey denoting that they are partially occupied.

Such a representation of the grid view allows for a computer-implemented mechanism to recognize the size and distance of the obstacles and allows the wheelchair to determine a remedial course of action to avoid the collision.

In one embodiment, the obstacles can also be classified as static and dynamic. Static obstacles are those that do not move from one frame to another while dynamic obstacles are those that have a velocity associated with them. This classification becomes valuable when some exceptional or edge cases are concerned.

Figure 3:
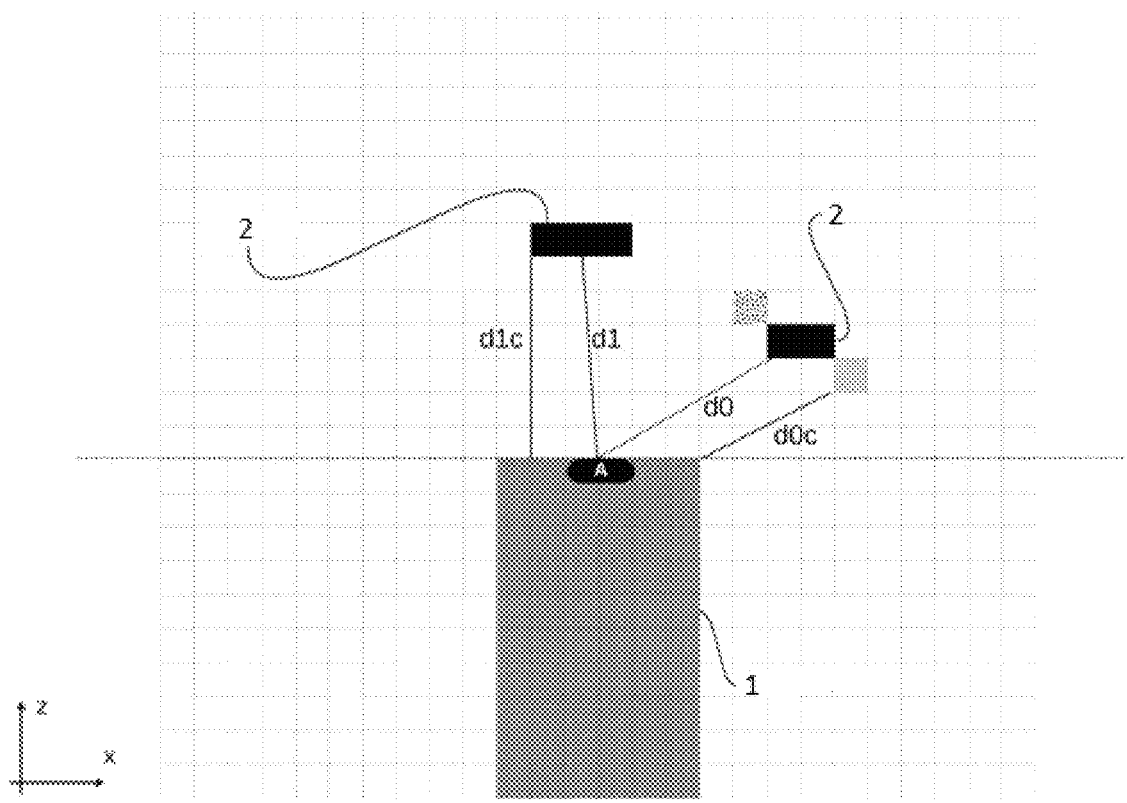
FIG. 3 illustrates the planar area illustrating the distance between the vehicle and different obstacles

As an example, in FIG. 3, there are two obstacles 2 shown. The distances to these two obstacles, d0 and d1 may be computed as the shortest distance between the set of grid elements denoting the wheelchair 1 and the set of grid elements denoting the obstacle 2. These are shown as d0c and d1c, denoting the distance between closest points between the set of grid elements for the wheelchair 1 and the obstacles 2.

The obstacle's location may not be permanent in the scene. As might be apparent, dynamic obstacles, by definition, constantly being on the move do not maintain positional information from one frame to another. Hence, their locations in the grid elements are expected to have a short memory or retention time. Static obstacles, on the other hand, are retained in the memory for longer durations hence helping build a map of the grid view.

Accordingly, the processing unit used for vehicle movement may further segment the scene into two subclasses of static obstacles:
1. Zero-likelihood of movement: These are obstacles that resemble walls, doorways, structural elements of a building that typically do not move. The location of these obstacles assigns these obstacles a memory coefficient of 1.
2. Non-zero-likelihood of movement: These are obstacles that resemble features like furniture, trash cans, vehicles that are parked, and the like that while static in the current sampling of the scene have non-zero-likelihood of movement, e.g. furniture could be moved, parked vehicles repositioned, trash cans moved for cleaning, etc. These obstacles are given a range of memory coefficients that span from "0" to "1", with obstacles like large heavy furniture receiving values close to (but not equal to) "1", obstacles like parked vehicles receiving memory coefficients close to (but not equal to) "0" and obstacles that move a few times a day like trash cans receiving a memory coefficient around "0.5".

In a given scene, each grid element that represents obstacles is labeled with 1. velocity,
2. type: static or dynamic
3. Static obstacles are labeled with their likelihood of movement and their marking on the grid decays with an exponential-like function as a function of time. Obstacles with zero likelihood of movement will decay with the rate of exp(0)=1, which in turn implies that they are retained in the memory of the computing platform. Obstacles with non-zero-likelihood of movement decay with the rate of exp(−likelihood*n*Δt) where Δt denotes the time period between observations and n denotes the number of frames since the obstacle was first observed. The exponential decay function is purely exemplary, and many other decay functions may be implemented.
4. Dynamic obstacles are labeled by an additional sub-type of predictable or unpredictable velocity, which comes into play when the dynamic obstacle is another wheelchair or PMD or autonomous vehicle that can exchange capabilities and information about its movement via vehicle to vehicle communications.

In one implementation of the invention, a powered wheelchair is provided that is using at least two sets of sensors with overlapping fields of view. The sensors used are at least one monocular vision sensor and at least one depth sensor. The measurements from these sensors are fused on a continuous frame-by-frame basis so as to provide for a consistent set of depth estimates to obstacles in its field of view.

Estimating depth from a monocular color image is a large field of research and has resulted in multiple innovations that are used in the research domain to estimate the depth of obstacles from the perspective projection on the camera sensor. While there is limited additional detail from a color image, the use of phase difference between nearby sensor sites on a Bayer color array is also used to estimate the depth of obstacles, all these solutions rely on multiple views of the same obstacle to estimate depth.

When using a purely monocular solution, depth estimation using techniques of deep neural networks are by far the most advanced. The reliance on high-quality and large-scale training data however is key.

The critical challenge around using results that are obtained by such monocular solutions is the inability to determine accurate absolute depth consistently in each frame. One could retrain the neural network for the application being used, but there are no guarantees that the results will be accurate from a depth standpoint.

Figure 4:
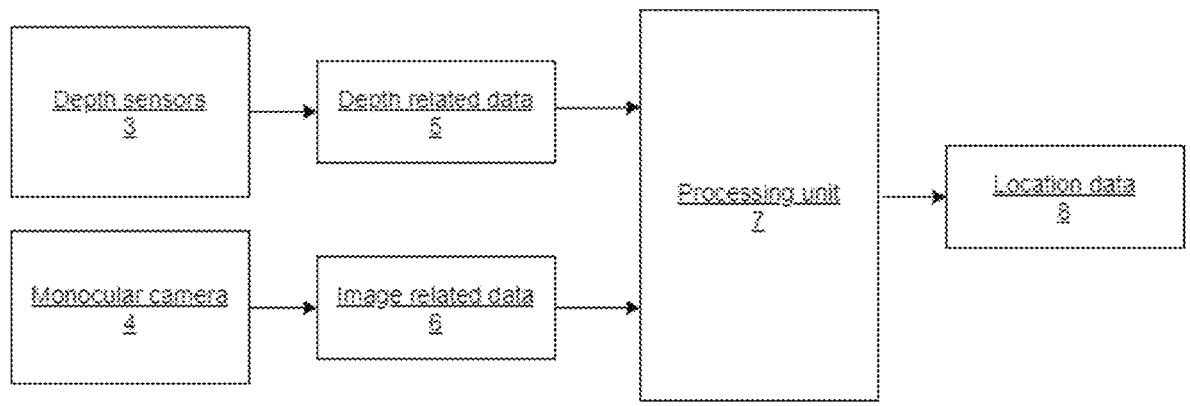
FIG. 4 illustrates a schematic diagram showing the processing of data from monocular cameras and depth sensors.

To that end, in an application where there is a collection of depth sensors 3 along with a monocular camera 4, as shown in FIG. 4. The depth sensors 3 generate depth-related data 5, and the monocular camera generates image-related data 6. The processing unit 7 processes the image-related data 6 and the depth-related data 5 and generates the location data 8. The processing unit 7 uses a technique, which continuously normalizes the range of the depth values provided by a monocular depth estimation solution using accurate depth values obtained from the depth sensor to obtain a high resolution and accurate depth estimate of the scene. This accurate depth estimate represents the location data 8 of the obstacles. In one embodiment, any other type of camera or vision sensor can be used instead of the monocular camera.

Figure 5:
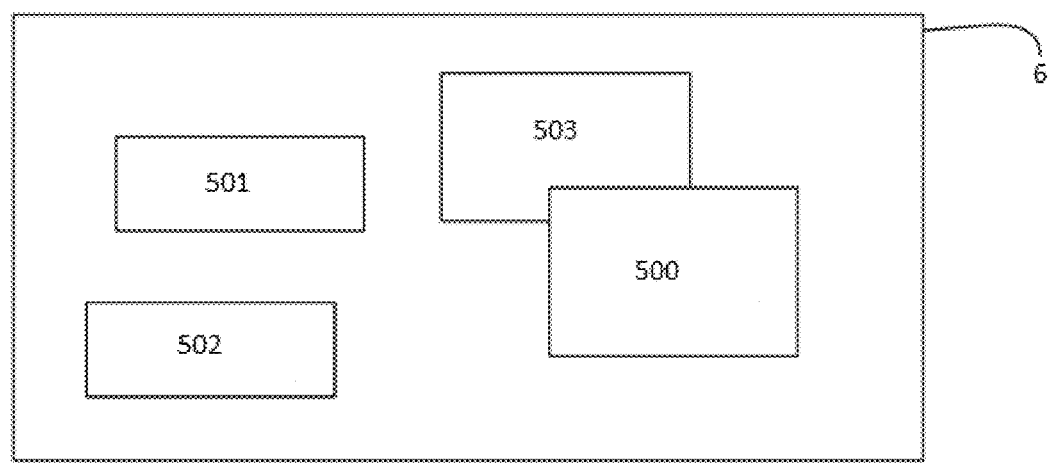
FIG. 5 illustrates an exemplary scene showing four obstacles placed in the scene for which a depth estimation is to be carried out.

Consider, for example, the scene shown in FIG. 5, which represents image-related data 6 showing four obstacles 500, 501, 502, 503, each of which has an estimate of depth that is obtained from monocular depth estimation techniques. Obstacles 500, 501, 503 have a true depth value that is obtained from the stack of depth sensors on the wheelchair or Personal Mobility Device (PMD). These depth sensors however are unable to ascertain the depth of obstacle 502 for a possible variety of reasons:

If using a LIDAR-like solution,
    Perhaps Obstacle 502 is out of the Field of View (FOV) of the LIDAR and hence the LIDAR camera is unable to estimate the distance,
    Perhaps Obstacle 502 is occluded to either the transmitted laser or the receiving camera,
    Obstacle 502 has a bright emission of the exact same wavelength of LASER that is being used by the LIDAR and hence not resulting in a depth estimate,
    Perhaps Obstacle 502 has a reflectivity that renders it useless for a LIDAR application.
If using a structured light solution,
    Perhaps Obstacle 502 is out of the FOV of the structured light camera and hence an estimate is not possible,
    Perhaps Obstacle 502 is occluded to either the transmitted structure light emitter or the receiving camera,
    Obstacle 502 has a bright emission of the exact same wavelength of light that is being used by the structured light emitter and hence not resulting in a depth estimate,
    Perhaps Obstacle 502 has a reflectivity that renders it useless for a structure light application.
If using a stereo pair to determine the depth,
    Perhaps Obstacle 502 is visible to only one camera and not the other hence an estimate is not possible,
    Perhaps Obstacle 502 has a physical pattern or reflectivity that renders it useless for a stereo pair application,
    Obstacle 502 has a bright emission that is flooding one or both cameras and hence not resulting in a depth estimate.

The reasons for an actual depth being unavailable are many and only a few are listed above, but it suffices to say that this is a common occurrence in any modality. To complement such a shortcoming, a monocular camera system is used in the implementation of the current invention to provide coverage under additional experimental and real-world conditions.

In this scenario, while a monocular depth solution provides for an estimate of depth, the challenge is that the estimate is relative. For example, the dynamic range of the output could be from 0 to 10000 in intensity (arbitrary units), while the distances in the scene could be from its blind spot distance to 300 cm. This invention addresses how these distances need to be mapped.

Figure 6:
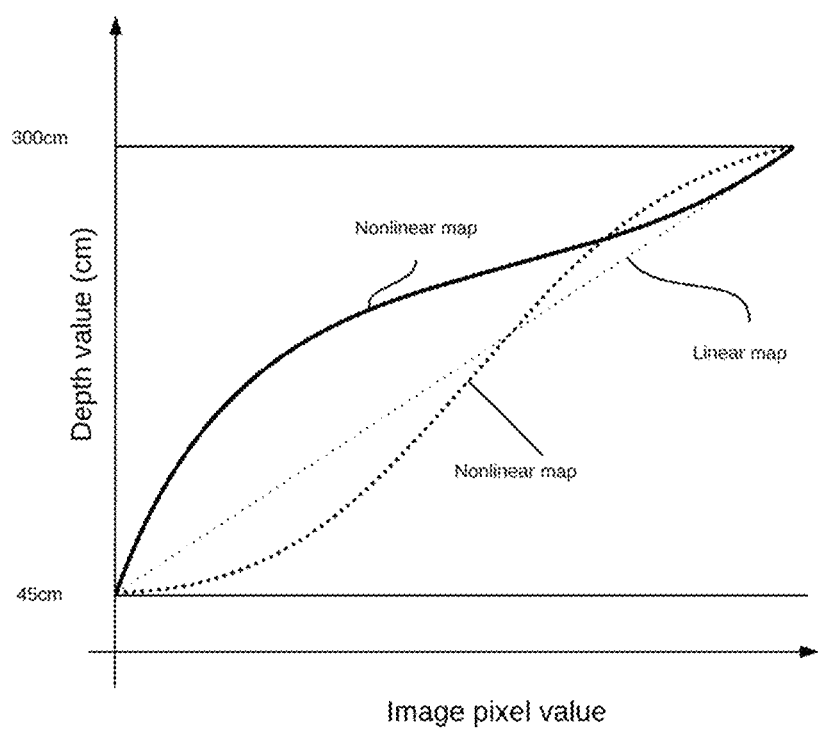
FIG. 6 illustrates a graphical representation of depth values w.r.t image pixel value for a predefined depth range using linear or non-linear scale.
Figure 8:
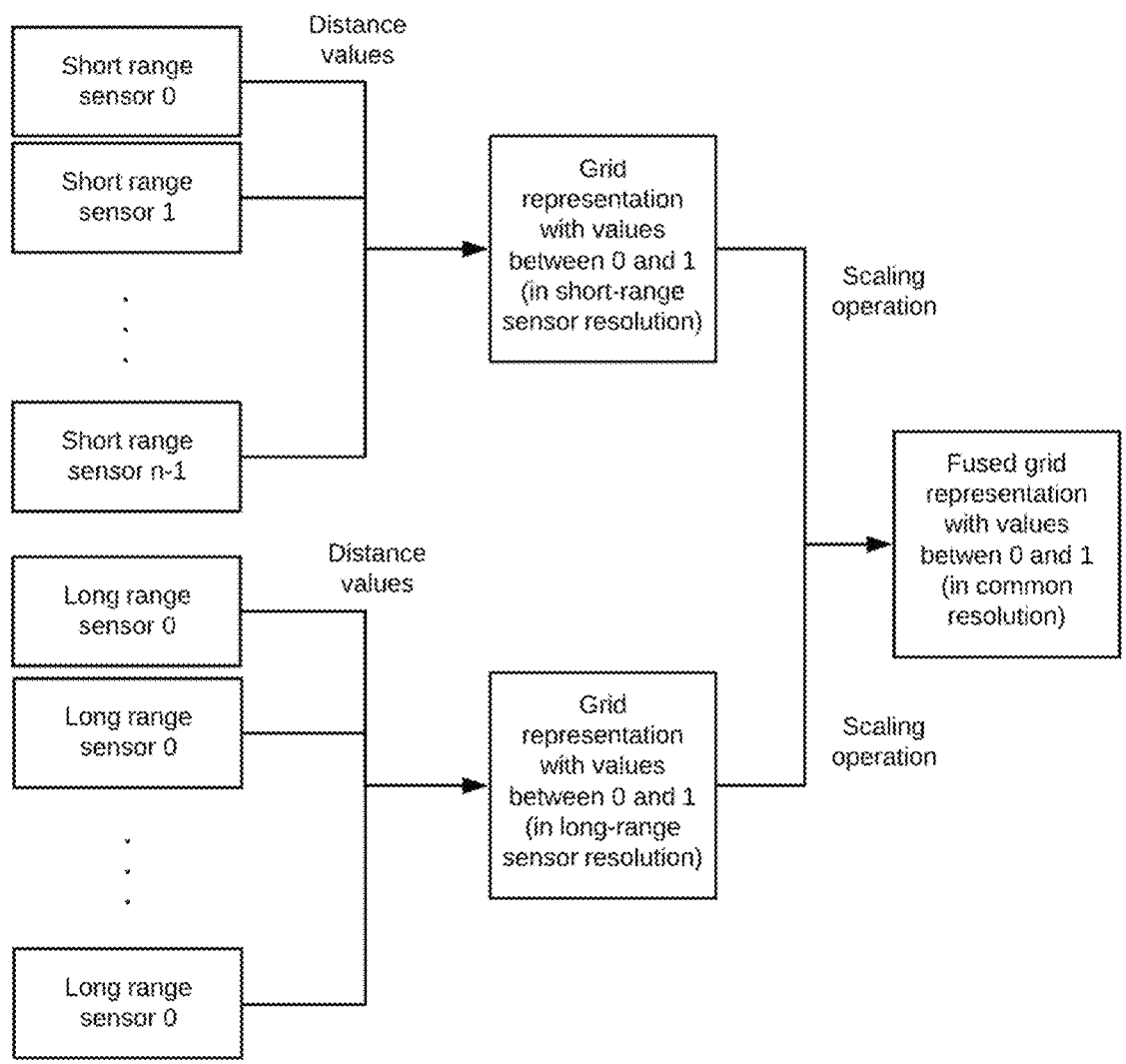
FIG. 8 illustrates a schematic flow of fusion of inputs from various sensors using a deterministic approach.

In the space of global scaling, a few solutions are possible. Assuming the blind spot distance is 45 cms, one can map 0 to 10000 from the monocular depth solutions to 45 cms to 300 cms using a linear or non-linear scale, as shown in FIG. 6.

The use of non-linear maps is critical, especially when the data is correlated with a specific function for say, 45 cms to 100 cms, yet another function from 100 cms to 200 cms and then a further different function from 200 to 300 cms. This mapping table can be determined using a calibration process and stored in non-volatile memory to be utilized when needed.

The downside of such an approach is that the distance between the wheelchair or PMD and the blind spot (the blind spot of the depth sensors) remains unmapped.

An alternate means to determine the mapping between the absolute depth as provided by the depth sensor system and the estimated depth from the monocular camera system makes use of a spatially varying scale factor.

In an embodiment, each depth image can be segmented into a fixed set of sub-images arranged uniformly across the image, as shown in FIG. 7. Each of these segmented blocks will have an absolute depth value. Let's denote the average of non-zero depth values of each block with d_avg_ij. Let's also denote the number of pixels in a block with non-zero depth values as n_ij. Let's assume that each block has a total of t_ij pixels in it. Denote the scale value of a given block by scale_ij. Let c_ij denote the confidence level of the measurements in that block given by n_ij/t_ij.

In the simplest case of there being just one block, d_avg_00 denotes the average depth of the scene and n_00 denotes the number of pixels showing non-zero depth. It is typical for depth measurement systems to return values of zero for locations in the real world for which they are unable to measure depth. Some of the reasons for such a scenario for zero-depth measurement have been previously elaborated. In this case, n_00/c_00 denotes the proportion of the number of pixels overall that have non-zero values. In one extreme example, c_ij=n_00/t_00=0 and consequently d_avg_00=0. In such a case, we have zero confidence that the depth sensor made useful measurements. In another scenario, c_00=n_00/t_00=0.5 which gives us 50% useful depth data from the scene. In this case, the average depth of the scene, d_00 can be used to determine a scale factor to normalize the monocular image's estimates. In other words, continuing with the 45 cm-300 cm range as the valid depth data and 0-10,000 as valid monocular depth estimates values, the scale factor applied to the monocular depth estimates would be scale_00=d_00/avg (monocular depth image estimate). Of course, this only gives us 50% confidence that the scaling will be accurate.

This single one-block example can be extrapolated to the 20 blocks shown in FIG. 7, which will result in potentially 20 value pairs of (n_ij,d_avg_ij) which could use varying degrees of confidence for each such block. The division of the scene into increasing numbers of blocks gives a higher level of detail to the scaling for each frame. For a block where n_ij is low (usually below 0.5), a few strategies may be used, such as:

Replace the d_avg_ij for that block from the nearest neighboring block. A variety of choices are possible and the one with the highest confidence value is used.

Replace the d_avg_ij for that block with the average of the immediate nearest neighbors with the top three confidence values. The choice of three neighbors is purely arbitrary.

In order to avoid abrupt boundaries in the scale factors from one block to the next when determining scale factors, the following approach may be used:

Assign the center of each block with d_avg_ij.

For any location in the image, perform interpolation between the neighboring d_avg_ij values to estimate a new d_avg_ij' value.

Every pixel now has a moving average value of the scale factor scale_ij' given by the ratio of d_avg_ij'/avg (monocular depth image estimate).

This gives every pixel in the monocular depth image a unique scale factor and ensures smooth transitions.

Alternatively, the following approaches may be used in an alternate embodiment:

Assign the centre of each block with a scale factor of scale_ij=d_avg_ij/average (monocular depth image).

For any location in the image, perform interpolation between the neighboring scale factors.

This gives every pixel in the monocular depth image a unique scale factor and ensures smooth transitions.

While a 4×5 tessellation of the image is chosen in the example above, the choice of the block size is highly dependent upon the user's preference. For example, an 8×8 tessellation can also be used in indoor scenes efficiently.

Like any sensor, there is noise measured in the depth sensed images as well. In order to address rapid movement in the scale factors for converting the monocular depth estimated image, a simple temporal filter may be applied to each of the localized scale factors, as mentioned in the example of FIG. 7. In such a scenario, scale_ij(t) which denotes the scale_ij_value at a given time, t, is given by $$\text{scale\_}ij(t) = \text{alpha\_1} * \text{scale\_}ij(t-1) + \text{alpha\_2} * \text{scale\_}ij(t-2) + \ldots + \text{alpha\_}N * \text{scale\_}ij(t-N),$$

where all alpha_i sum to 1.0. The choice of the specific values of alpha_i and N are user-dependent and determine the amount of memory that is intended to be retained.

To fuse the measured data with the scaled monocular depth estimate, we utilize the c_ij values determined in the example of FIG. 7. From the low-resolution image of confidence values, a higher resolution image is generated of the desired size of the output fused image. Let's denote the pixel values to be given as c (x, y), where x, y denotes the x and y coordinates of the resulting image.

Each pixel in the fused image is given as a convex linear sum of the depth and monocular depth estimate image:

$$\text{Fused\_image}(x,y) = c(x,y) * \text{depth\_image}(x,y) + (1 - c(x,y)) * \text{scaled\_monocular\_depth estimate}(x,y),$$

The intent of which is that in regions where the confidence of the depth image is high, the depth image data can be used as is, and where it is low, the scaled monocular depth image estimate has to be relied upon.

In an early fusion approach, the depth results from the depth sensor are merged with the RGB image obtained from the camera before applying the monocular depth estimation algorithm. The merged depth and RGB data are then used as the input to a deep learning-based depth estimation network. This network is trained to estimate the depth from the RGB image, and also use the valid depth values from the depth sensor when possible. If depth sensor data is not available for some parts of the image, the network will estimate the depth for those areas by using the RGB data and the previously learned features obtained from the depth sensor.

In one implementation of the invention, a powered wheelchair or powered mobility device (PMD) is provided that uses long-range and short-range sensors has a variety of signal inputs that need to be combined to make a decision on which direction to move specifically as it sends commands to the motor controller for the purposes of obstacle avoidance or autonomous movement. The embodiments explained further establishes how these two signals may be combined to provide a seamless experience.

While each obstacle (denoted by an entry in the grid representation) is assigned multiple features, at a given measurement frame, data obtained from the long-range sensors and the short-range sensors are fused to result in the grid representation using either a deterministic approach or a probabilistic approach.

In a deterministic approach, at a given frame, distances to all the obstacles visible to the sensors (long and short-range) are measured or estimated, as the case may be, and all associated grid elements are updated with a value between "0" and "1". In such an approach, the grid representation serves as the container of all fusion needs. This approach gives equal weight for different sensor readings. A schematic representation of this approach is provided in FIG. 8, where firstly distance information of the obstacles is from each of the sensors are determined, thereafter, distance information for each of the short-range sensors are fused to form a grid view representation for the short-range sensors, and distance information from long-range sensors are fused to formulate a grid representation for long-range sensors. Further, scaling of the grid view representation is carried out, and further values of grid elements from the long-range sensors and short-range sensors are fused to provide a fused grid view representation showing consolidated values for each of the grid elements.

The probabilistic approach adds a layer of complexity tied to the confidence level that a given sensor is indeed accurate. For example, short-range sensor data for obstacles that are at larger distances is prone to a lower signal-to-noise ratio and should be given a lower weight for inclusion into the fused grid representation. In the case that a short-range sensor numbered 10 indicates that a grid element (x, z) has an obstacle, the value of grid element g(x, z, t) at a location of (x, z) at a time instant t gets a value of 1*exp(−d*alpha_10) where d is the distance from the location of the wheelchair sensor numbered 10 to the obstacle and alpha_10 is a weight factor that is determined during calibration and tuning. This exponential decreasing function referred to as the short-range sensor confidence function can be replaced by a sigmoidal function with "1" when the distance is zero and "0" when the distances are large. The specific tuning parameters of the sigmoid function are highly dependent on the sensor used and the application of the sensor.

Figure 9:
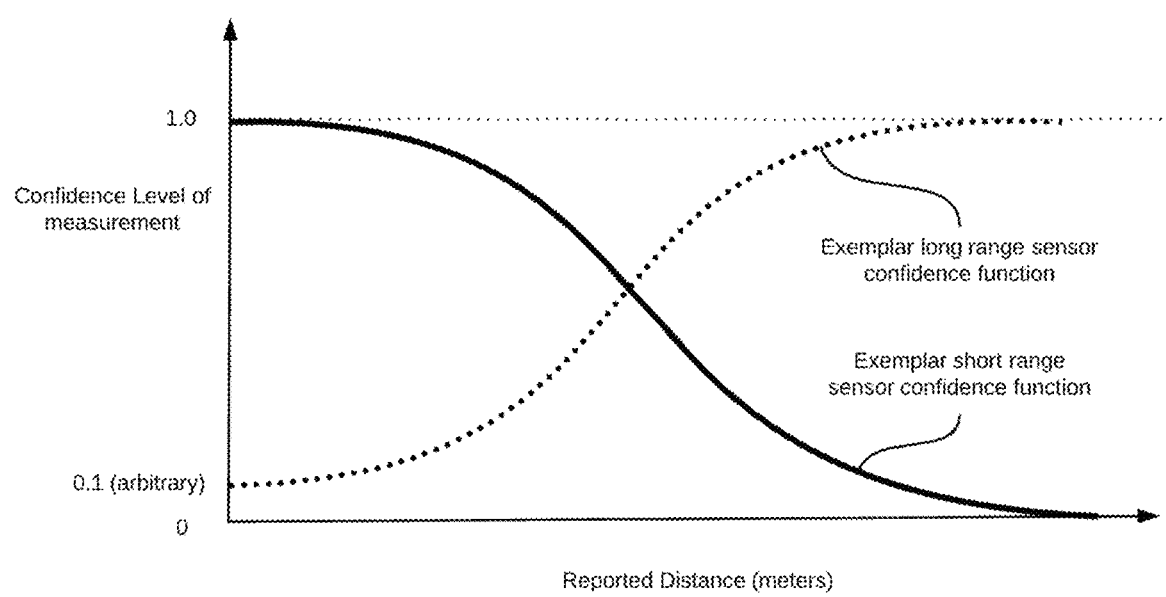
FIG. 9 illustrates a graphical representation of the confidence level of inputs received from short-range sensors and long-range sensors with respect to the distance to the obstacle.

Similarly, long-range sensor performance for nearby obstacles will likely be less accurate than the data reported by the short-range sensors for the same obstacle. In these situations, a weighted map (that is generated at the time of calibration of the sensor stack in the vehicle) that gives the long-range sensors lesser weight near the vehicle and higher weight farther away from the vehicle is used. In the case that a long-range sensor numbered 40 indicates that a grid element (x, z) has an obstacle, the value of grid element g(x, z, t) at a location of (x, z) at a time instant t gets a value of 1*exp(d*alpha_40), where d is the distance from the location of the wheelchair sensor to the obstacle and alpha_40 is a weight factor that is determined during calibration and tuning. This exponential increasing function referred to as the long-range sensor confidence function can be replaced by a sigmoidal function with a small number (close to zero) when the distance is zero and "1" when the distances are large. The specific tuning parameters of the sigmoid function are highly sensor-specific and application-dependent. These functions of long-range sensors and short-range sensors are shown in FIG. 9.

Figure 10:
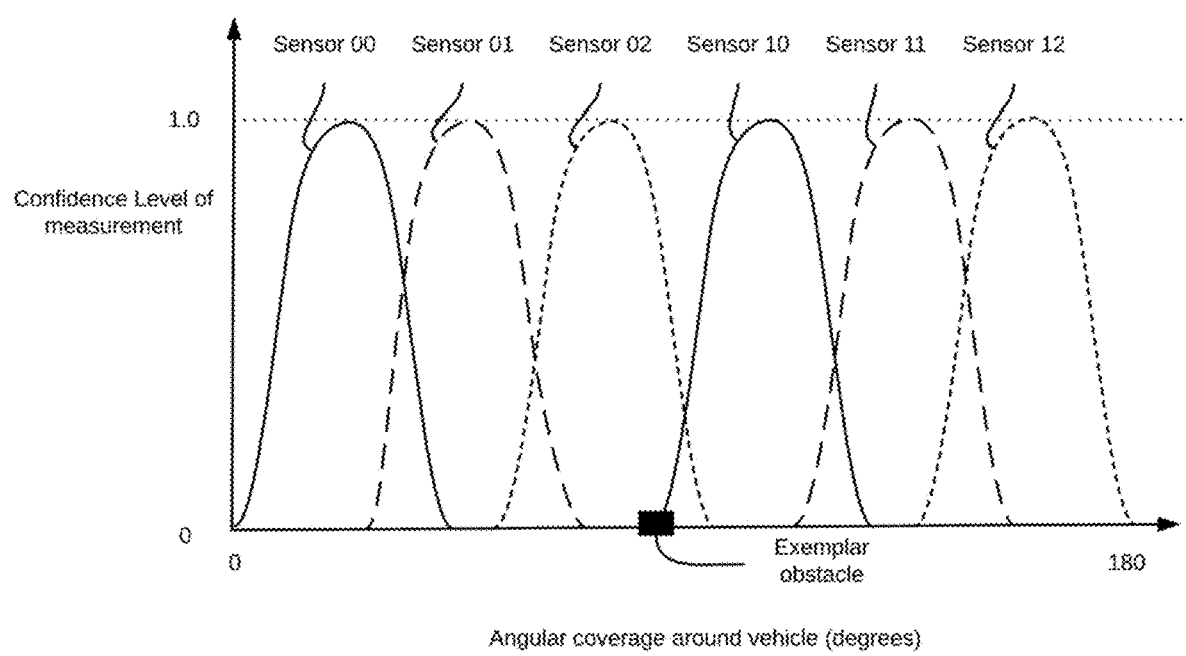
FIG. 10 illustrates a graphical representation of the confidence levels of various sensors when an angular measurement is carried out with respect to an obstacle.

Another such situation arises when the obstacle distances are reported with obstacles being near the edge of a sensor's Field of View (FOV). Another such situation arises when there is an obstacle in the outer edges of the FOV of the sensor numbered 10, a distance reading is obtained. Let's assume that this corresponds to the grid element (x, z). For the sake of illustration (as shown in FIG. 10), let's assume that point (x, z) resides in the FOV of sensor 02, near the center of its FOV. In such a scenario, instead of relying entirely on one sensor or the other, reliance on the distance reading from sensor 02 shall be better with respect to the sensor 01, because the probability of getting high-quality data from sensor 02 is higher than from the sensor 01 given its proximity to the center of its FOV. This situation typically arises when the same obstacle provides readings to multiple sensors. It further occurs when each sensor provides multiple spatial and angular readings.

Figure 11:
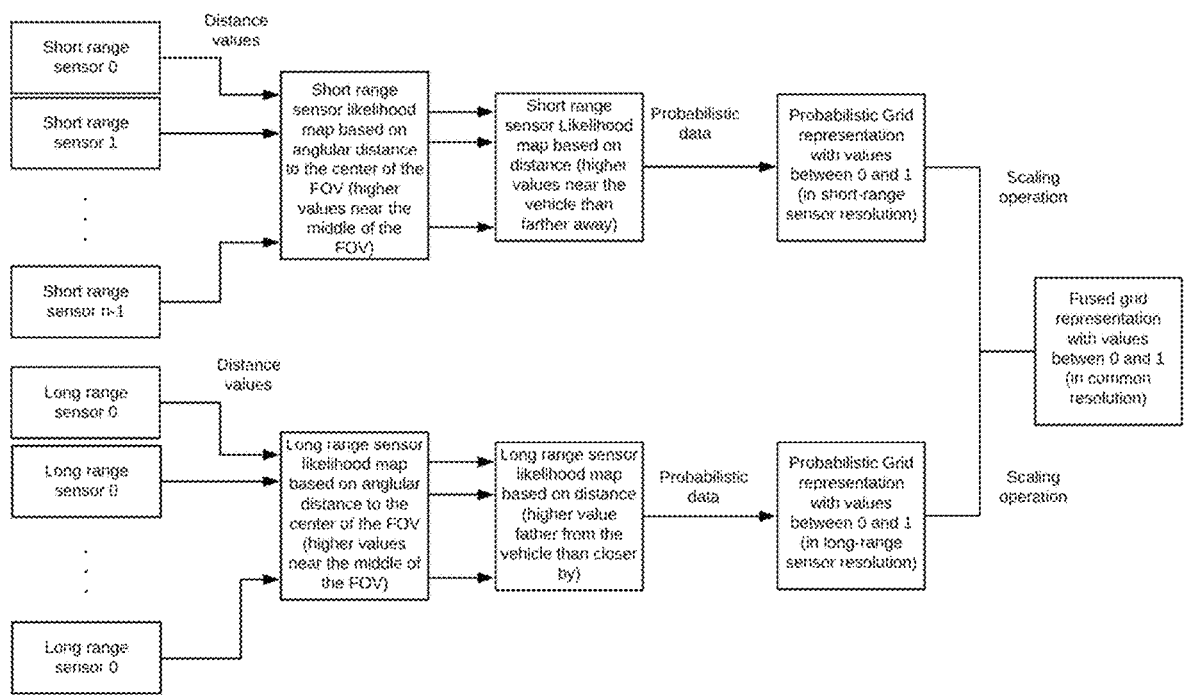
FIG. 11 illustrates a schematic flow of fusion of inputs from various sensors using a probabilistic approach.

In furtherance, the entire approach for this type of fusion may be condensed into a flow chart as shown in FIG. 11. This flowchart explains first generating short-range likelihood maps based on the angular distance of the obstacle to the center of FOV of the short-range sensors, and similarly, generating long-range likelihood maps based on the angular distance of the obstacle to the center of FOV of the long-range sensors. Thereafter normalizing the short-range likelihood map, and the long-range likelihood map. Further generating probabilistic grid view representations of long-range sensors, and short-range sensors, and thereafter applying scaling operations to the grid view representation, and finally fusing them to generate a fused grid representation view.

Any decay or update from one frame to the next can be done through a variety of methods in and of itself including a decay function described previously or a Kalman filter update using a prediction and update steps. A data update rate of 30 fps or higher the decay approach is better suited given the reduced computational complexity. At slower frame rates (be it because of slow update rates on the raw data or slower computational speeds) where obstacles are classified as a set of grids, Kalman filter-based approaches are better suited.

All these approaches result in a frame-by-frame determination of the obstacle map around the wheelchair or PMD.

Figure 12:
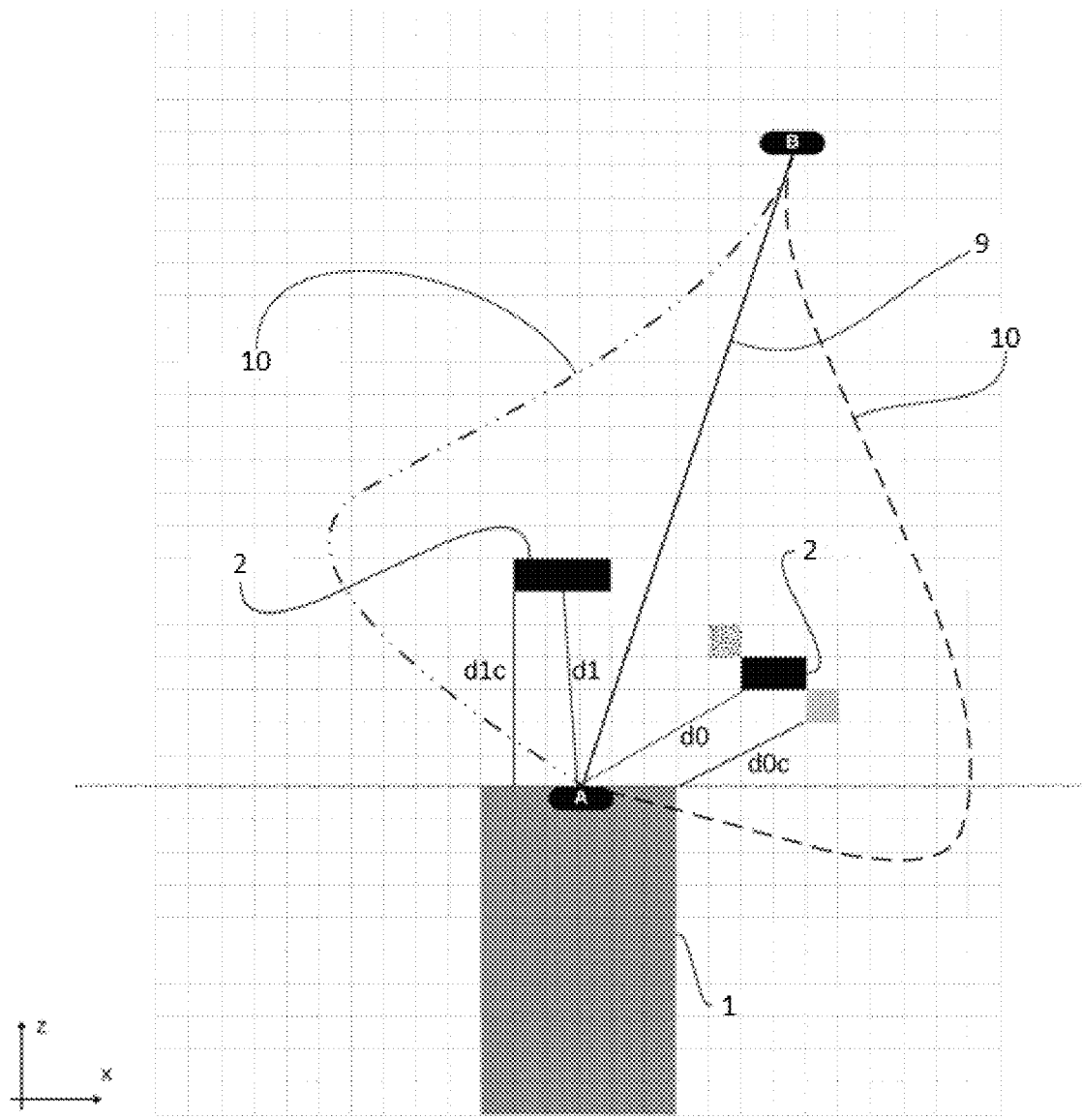
FIG. 12 illustrates an example of a map view showing probable paths to be taken by a wheelchair in presence of multiple obstacles.

With this kind of marking of the scene and categorization of obstacles, memory maps are generated. In furtherance, these memory maps shall be utilized by computer-implemented systems and methods to move from one point to another on a map. FIG. 12 shows navigation of the wheelchair or PMD 1, which is done such that:

1. The probabilistically or deterministically computed map now allows computation of distances d*c (depending upon the number of obstacles in the path, this could be d0c, d1c, d2c, etc.) to the closest obstacle 2. The vehicle is navigated such that all d*c's are always greater than a predetermined threshold which could be a user-generated feature to ensure the rider's comfort level of "distance to the closest obstacle"
2. The direction of motion is along the target vector. This can be achieved through a means of computing the shortest distance 9 from Point A (current location) to Point B (the next location) while avoiding other path options 10, as shown in FIG. 12.

Figure 13:
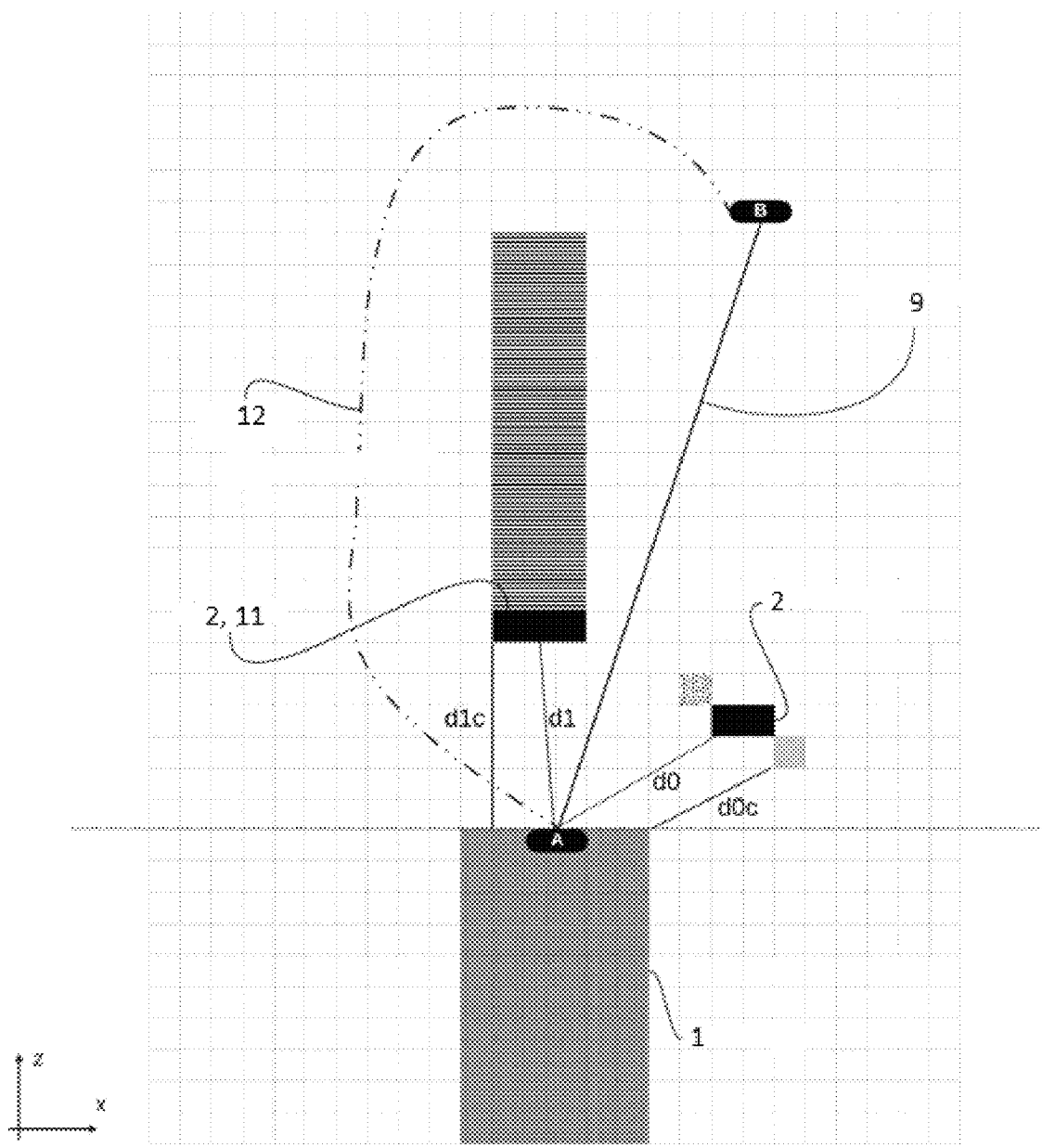
FIG. 13 illustrates another example of a map view showing the path taken by the wheelchair in a scenario when multiple obstacles are present, and one of the obstacles is very large.

This approach has the advantage that it is relatively simple to execute, however, a big disadvantage of such an approach is that this solution tends to go along the surfaces of the obstacles closest to it. Also given the location of the sensors, oftentimes, we are unable to represent the plan view of the entire obstacle; but instead, only see what is visible to the sensor stack. This means that if one of the obstacles 2 is a large obstacle 11, as shown in FIG. 13, in the first observation frame, we see the black grids shown in black as potentially obstructed. As the wheelchair or PMD 1 moves along the perimeter of a large obstacle 11, the obstacle's size reveals itself given the field of view of the sensors and we eventually find that the path to the target is either inordinately long 12 or we are unable to reach it. This is an infrequent case, however still relevant to be addressed as the wheelchair or PMD 1 moved towards the target. To address this, it is critical to have a large FOV solution implemented for the sensors that are able to assess not just what is immediately visible along the movement vector but also along the sides of the wheelchair or PMD 1. In case of such large obstacles 11, it is seldom a possibility that the wheelchair shall be taking the shortest distance path 9.

Figure 14:
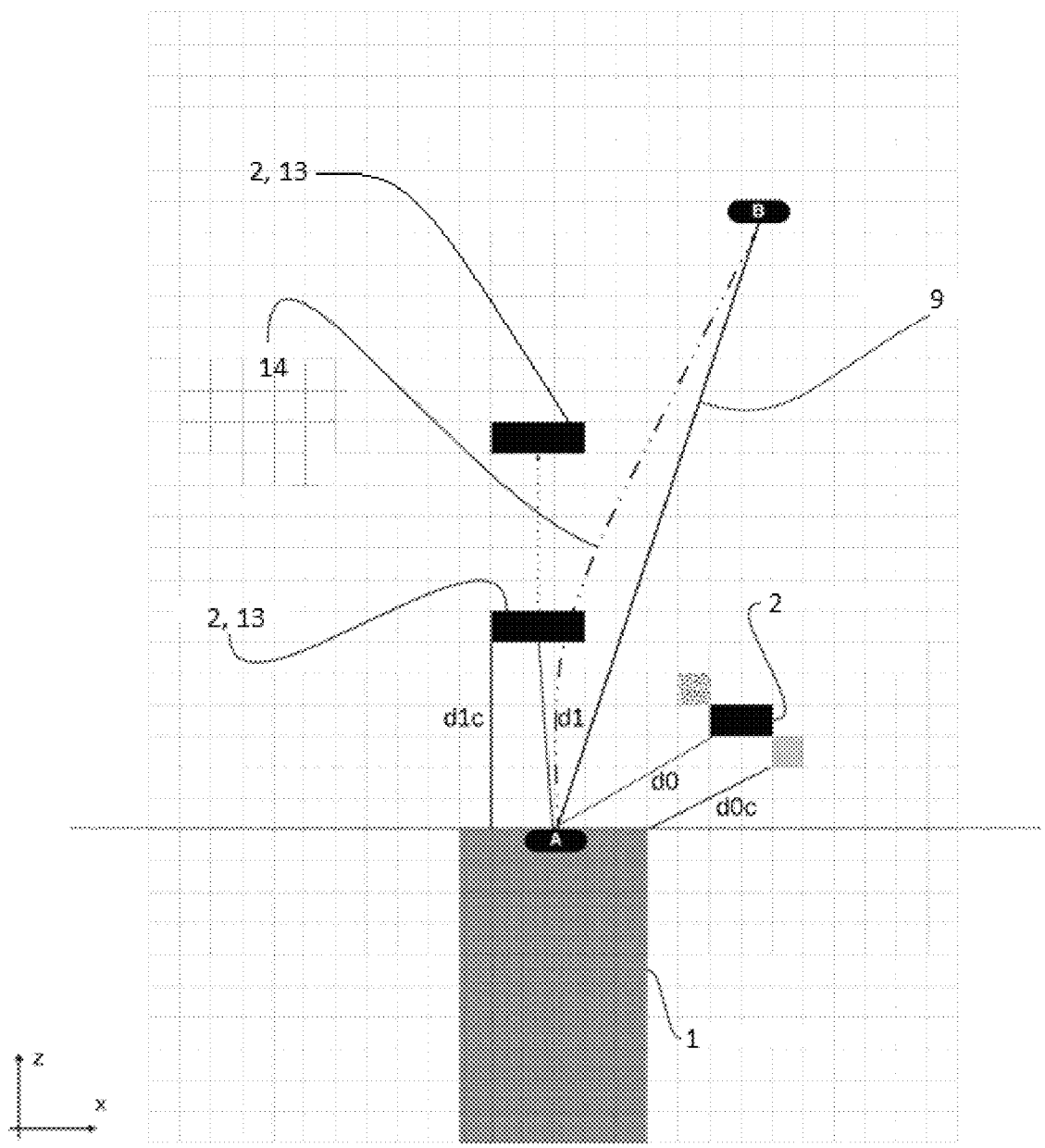
FIG. 14 illustrates another example map view showing the path taken by the wheelchair, using the "close follower" approach, in the scenario when multiple obstacles are present and one of the obstacles is dynamic.

This situation also occurs when one of the obstacles is a dynamic obstacle 13, as shown in FIG. 14. Envision a scenario where the dynamic obstacle 13 moves either a lot slower than the wheelchair 1 or has a start-stop behavior (say a person who is walking around the facility and stopping periodically). In case all obstacles as considered static, in order to avoid a collision, the wheelchair or PMD 1 would start moving along the path shown in the dash-dot line and find that independent of whether the sensor FOV is large or small, the dynamic obstacle 13 is traveling parallel to the wheelchair or PMD 1 and consequently, the distance between the wheelchair or PMD 1 and the target position does not have a path to converge to zero. The data from the sensors are used to label obstacles as being static or dynamic. This is done by measuring the relative speed of the obstacles. Static obstacles will have a relative velocity (speed and orientation of movement) close to zero. If an obstacle is dynamic, its relative velocity is not zero. There are two solutions envisioned to address such issues, the "close follower" solution which is detailed in FIG. 10, and the other one is the "fast overtaker" solution. However, there can be more solutions to address such issues.

In the case of dynamic obstacles 13, the wheelchair or PMD 1 needs to adjust its speed to either match the speed of the obstacle or reach its maximum speed, whichever is lower. This is referred to as the "close follower" mode of movement. This allows for the gap between the two obstacles to increase enough so as to find a complete path 14 to the target which might coincide with the shortest path solution. The "close follower" mode ensures that the distance to the target location is not allowed to diverge.

In the second approach, the wheelchair or PMD needs to adjust its speed to pass (overtake) the dynamic obstacle and then find its way to the target. This is referred to as the "fast overtaker" mode of movement. This is a challenging approach to undertake as the velocity of the obstacle needs to be continuously tracked and places a significant computational burden on the system. This complexity in computation is further amplified when one considers that in real-world settings, there are many such obstacles that need to be tracked and maneuvered around. However, this approach works well in situations where the speed of the dynamic obstacle is particularly slow compared to the speed capabilities of the wheelchair or PMD and is further applicable when the velocity of the dynamic obstacle is predictable. This occurs in scenarios where the dynamic obstacle is yet another autonomous vehicle.

LIST OF REFERENCE SIGNS

1. Wheelchair/Personal mobility Vehicle
2. Obstacle 500, 501, 502, 503.
3. Depth sensors
4. Monocular camera
5. Depth related data
6. Image related data
7. Processing unit
8. Location data
9. Shortest distance path
10. Path options
11. Large obstacle
12. Inordinately long path
13. Dynamic obstacle
14. Complete path during the "close-follower" approach
15. System
16. Change Frequency
17. Dynamic distance
18. Velocity
19. Movement probability data
20. Velocity prediction data
21. First Categorization data
22. Movement grade
23. First Decay rate rule
24. Predictable velocity obstacles
25. Unpredictable velocity obstacles
26. Movement state categorization
27. Sensors
28. Individual location data
29. Second decay rate rule
30. Kalman filter rules
31. Navigation unit
32. Navigation path
33. Probable distance
34. Threshold distance
35. Distance data

The invention claimed is:

1. A system for controlling the movement of a personal mobility vehicle comprising:
   a processing unit adapted to receive and process a location data of one or more obstacles over a period of time and adapted to determine:
      a change frequency of change of location of the obstacles during the period of time and further adapted to generate a movement state categorization of the obstacles categorizing them into either a dynamic obstacle or a static obstacle,
      a dynamic distance traveled by the dynamic obstacle during the period of time and to further determine a velocity of the dynamic obstacle,
      based on the change frequency, a movement probability data which relates to the probability of movement of a static obstacle, and
      based on the velocity of dynamic obstacles during various time intervals of the time period, a velocity prediction data that relates to the prediction of the velocity of a dynamic obstacle.

2. The system as claimed in claim 1, wherein the movement probability data comprises a first categorization data categorizing obstacles into zero likelihood movement obstacles or non-zero likelihood movement obstacles,
   wherein the zero likelihood movement obstacles are the ones that are structural fixtures or permanent fixtures present in the environment, and the non-zero likelihood movement obstacles are the ones that are non-permanent fixtures or which have changed their location in the environment in a predefined time frame.

3. The system as claimed in claim 2, wherein the processing unit is further adapted to generate a movement grade for the non-zero likelihood movement obstacles, such that the movement grade defines the probability of the obstacle to move, where higher movement grade is assigned to the obstacles that have changed its location multiple times during the predefined time frame or were absent in the environment for a long time during the predefined time frame.

4. The system as claimed in claim 3, wherein the processing unit is adapted to modify the movement grade of the non-zero likelihood movement obstacles based on their movement frequency in a predefined time period.

5. The system as claimed in claim 4, wherein the processing unit is adapted to modify the movement grade of the non-zero likelihood movement obstacles of the obstacles based on a first decay rate rule, wherein the first decay rate rule takes into consideration of the movement of the obstacle in previous time instances.

6. The system as claimed in claim 1, wherein the processing unit is adapted to establish a communicative coupling with the dynamic obstacles, and to categorize the dynamic obstacles as predictable velocity obstacles if the processing unit is able to establish the communicative coupling to the dynamic obstacle, and to categorize the dynamic obstacles as unpredictable velocity obstacles if the processing unit is not able to establish the communicative coupling to the dynamic obstacle.

7. The system as claimed in claim 1 comprising:
one or more sensors adapted to sense the presence of one or more obstacles at more than one instance of time and to generate the location data of the obstacles.

8. The system as claimed in claim 7, wherein when there is more than one sensor, each of the sensors is adapted to generate an individual location data for one obstacle, the processing unit is adapted to process the individual location data from each of the sensors giving equal weightage to each of the individual location data from each of the sensors, and to generate the location data.

9. The system as claimed in claim 7, wherein the system includes one or more long-range sensors, and one or more short-range sensors, wherein the long-range sensors are those that have a better spatial resolution at large distances, and the short-range sensors are those having a better spatial resolution at smaller distances.

10. The system as claimed in claim 9, wherein each of the sensors is adapted to generate an individual location data for one obstacle, the processing unit is adapted to process the individual location data from each of the sensors giving higher weightage to the long-range sensors data for an obstacle at long distance, and to the short-range sensors for the obstacles placed at a shorter distance, and to generate the location data.

11. The system as claimed in claim 7, wherein when there is more than one sensor, each of the sensors is adapted to generate an individual location data for one obstacle, the processing unit is adapted to process the individual location data from each of the sensors giving higher weightage to the sensor data of the sensor for whom the obstacle is near to its center of the field of view, and to generate the location data.

12. The system as claimed in claim 7, wherein the system includes one or more vision sensors generating an image related data of the obstacle, and one or more depth sensors generating a depth-related data of the obstacle, the processing unit is adapted to process the image-related data and the depth-related data and to generate the location data.

13. The system as claimed in claim 7, wherein the sensors have a data generation frequency defining the number of times the sensor is adapted to generate an individual location data, and the processing unit is adapted to process the individual location data from a particular sensor by giving a weightage based on a second decay rate rule if the data generation frequency is more than a predefined threshold, or based on Kalman filter rules if the data generation frequency is less than a predefined threshold, and to generate the location data, wherein the second decay rate rules give higher weightage for frequent movement of the obstacles in previous time instances.

14. The system as claimed in claim 1 comprising:
a navigation unit adapted to receive the movement state categorization of the obstacles, the velocity of the dynamic obstacle, the movement probability data, the velocity prediction data, and a distance to the obstacles at a given point of time and adapted to determine a navigation path at a given point of time.

15. The system as claimed in claim 14, wherein the navigation unit is adapted to determine a probable distance of the obstacle to the vehicle in a subsequent point of time and to compare the probable distance of the obstacle and a threshold distance, and to generate the navigation path at a subsequent point of time.

16. The system as claimed in claim 15, wherein the navigation unit is adapted to determine the shortest possible distance between a current location of the vehicle and a target location of the vehicle at a given point of time, and to determine the navigation path at a given point of time along the shortest possible path, wherein the current location refers to the location of the vehicle where the vehicle is located at a particular instance of time, and the target location refers to the location of the vehicle where the vehicle is intending to reach.

17. The system as claimed in claim 1, wherein the processing unit is adapted to receive a grid view data of the environment in which the personal mobility vehicle is located, wherein the grid view data defines grid elements formed by dividing the planar view of the environment into grid elements of predefined sizes, and the processing unit is adapted to process the location data and the grid view data and adapted to determine the movement state categorization of the obstacles, the velocity of the dynamic obstacle, the movement probability data, the velocity prediction data, and a distance to the obstacles at a given point of time for each of the grid elements.

18. A method for controlling the movement of a personal mobility vehicle comprising:
receiving and processing a location data of one or more obstacles over a period of time,
determining a frequency of change of location of the obstacles during the period of time and generating a movement state categorization of the obstacles categorizing them into either a dynamic obstacle or a static obstacle,
determining a distance traveled by the dynamic obstacle during the period of time and to further determine the velocity of the dynamic obstacle,
based on the frequency of change of location, determining a movement probability data which relates to the probability of movement of a static obstacle, and
based on the velocity of dynamic obstacles during various time intervals of the time period, determining the velocity prediction data which relates to the prediction of the velocity of a dynamic obstacle.

19. A computer program product, stored onto a non-transitory medium, on execution onto one or more processors, enable the one or more processors to perform the following:
receiving and processing a location data of one or more obstacles over a period of time,
determining a frequency of change of location of the obstacles during the period of time and generating a movement state categorization of the obstacles categorizing them into either a dynamic obstacle or a static obstacle, determining a distance traveled by the dynamic obstacle during the period of time and to further determine the velocity of the dynamic obstacle, based on the frequency of change of location, determining a movement probability data which relates to the probability of movement of a static obstacle, and based on the velocity of dynamic obstacles during various time intervals of the time period, determining the velocity prediction data which relates to the prediction of the velocity of a dynamic obstacle.

\* \* \* \* \*